United States Patent
Muske et al.

(10) Patent No.: US 10,684,937 B2
(45) Date of Patent: Jun. 16, 2020

(54) METHOD AND SYSTEM FOR REPOSITIONING OF A PLURALITY OF STATIC ANALYSIS ALARMS

(71) Applicant: Tata Consultancy Services Limited, Mumbai (IN)

(72) Inventors: Tukaram B. Muske, Pune (IN); Rohith Talluri, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/209,579

(22) Filed: Dec. 4, 2018

(65) Prior Publication Data

US 2019/0391903 A1     Dec. 26, 2019

(30) Foreign Application Priority Data

Jun. 25, 2018  (IN) .............................. 201821023655

(51) Int. Cl.
*G06F 11/36* (2006.01)
*G06F 8/75* (2018.01)
(Continued)

(52) U.S. Cl.
CPC .......... *G06F 11/3616* (2013.01); *G06F 8/436* (2013.01); *G06F 8/54* (2013.01); *G06F 8/75* (2013.01)

(58) Field of Classification Search
CPC ............. G06F 11/3604; G06F 11/3624; G06F 11/3664; G06F 11/3672
(Continued)

(56) References Cited

U.S. PATENT DOCUMENTS

2015/0301922 A1 * 10/2015 Krauss ................ G06F 11/3604
717/131
2017/0308457 A1  10/2017 Barsness et al.
(Continued)

FOREIGN PATENT DOCUMENTS

JP           5665128          12/2012

*Primary Examiner* — John Q Chavis
(74) *Attorney, Agent, or Firm* — Finnegan, Henderson, Farabow, Garrett & Dunner LLP

(57) ABSTRACT

This disclosure relates generally to a system and a method for repositioning of a plurality of static analysis alarms is provided. The proposed repositioned techniques, reposition each of the static analysis alarms from the set of static analysis alarms up or down the application code from the program points of their original reporting, for reducing the number of static analysis alarms reported or for reporting them closer to their causes or for both the objectives. Further the proposed repositioning techniques also ensure that the repositioning of the static analysis alarms is without affecting the errors uncovered by them. Further the disclosure also proposes to maintain traceability links between a repositioned static analysis alarm and its corresponding static analysis alarm(s). Further the disclosure proposes to display the repositioned static analysis alarms to the user instead of the set of static analysis alarms, for reducing redundancy from reporting and manual inspections of the set of static analysis alarms. Furthermore the disclosure proposes to display the traceability links only if a user requests for the same.

9 Claims, 8 Drawing Sheets

(51) Int. Cl.
    *G06F 8/54*      (2018.01)
    *G06F 8/41*      (2018.01)
(58) Field of Classification Search
    USPC .......................................................... 717/124
    See application file for complete search history.

(56)                References Cited

U.S. PATENT DOCUMENTS

2018/0025157 A1*  1/2018  Titonis ..................... G06F 21/56
                                                                726/24
2018/0046564 A1*  2/2018  Muske ................. G06F 11/3604
2018/0114026 A1*  4/2018  Wang .................... G06F 21/577

* cited by examiner

```
1  void foo(){
2    int arr[5],tmp = 1, i = 0;
3
4    if(...){
5      if(...){
6        i = lib1();
7      } else {
8        i = lib2();
9    }
10   //assert(0≤ i ≤ 4);              $HA_{10}$
11     tmp = 0;
12   } else {
13     tmp = lib3();
14   }
15
16   if(i < tmp)
17     arr[i] = 0;    $A_{17}$
18   else
19     arr[i] = 1;    $A_{19}$
20 }
```

```
21 void bar(int ti) {
22   int n, j ,arr[5] , tmp = 1;
23
24   n = lib1();
25   if(...){
26     n = lib2();
27     t1 = t1 / n;        $Z_{27}$
28   } else {
29     t1 = 10 / n;  $Z_{29}$
30   }
31   //assert(n!=0);    $SA_{31}$
32   tmp = 0;
33
34   j = lib2();
35   //assert(0≤ j ≤ 3);   $HA_{35}$
36
37   t1 = arr[j];   $A_{37}$
38   j++
39   tmp = arr[j];  $A_{39}$
40 }
```

FIG. 5

```
1  void f1(){
2    int i = lib1() , a[5];
3
4    if(...){
5      //assert(0≤ i ≤4);      HA₅
6      if(...)
7        a[i] = 0;    A₇
8      else a[i] = 1 ;   A₈
9
10     if(...) return ;
11   } else {
12     i = lib2();
13     //assert(0≤ i ≤4);    HA₁₃
14     a[i] = 0;    A₁₄
15     if (...) return;
16   }
17   //assert(0≤ i ≤4);
18   i = 0;
19 }
```

FIG. 6

```
1  void f2(){
2    int a[5], tmp=1, i = 0, j;
3
4    if(...){
5       if(...){
6          i = lib1();
7       } else {
8          i = lib2();
9       }
10
11
12   } else {
13      tmp = lib3();
14   }
15   j=0;
16
17   a[i] = 0;    $A_{17}$
18
19 }
```

FIG. 7

| Application | Size (KLOC) | # Input | # Output | % Reduction | Redundant cords | Fall-backs | Inter-Functional | | Reasons for stopping | | |
|---|---|---|---|---|---|---|---|---|---|---|---|
| | | | | | | | Mergings | Repos. | Func entry | Branches | Definitions |
| acpid-1.0.8 | 1.7 | 5 | 4 | 20.00 | 0 | 0 | 0 | 0 | 1 | 2 | 1 |
| spell-1.0 | 2.0 | 17 | 17 | 0.00 | 0 | 0 | 0 | 0 | 3 | 9 | 5 |
| barcode-0.98 | 4.9 | 580 | 540 | 6.90 | 0 | 0 | 0 | 0 | 2 | 363 | 175 |
| antiword-0.37 | 27.1 | 748 | 689 | 7.89 | 6 | 0 | 1 | 35 | 93 | 454 | 142 |
| sudo-1.8.6 | 32.1 | 2548 | 2407 | 5.53 | 28 | 0 | 30 | 54 | 303 | 971 | 1133 |
| uucp-1.07 | 73.7 | 263 | 244 | 7.22 | 4 | 0 | 0 | 0 | 17 | 134 | 93 |
| ffmpeg-0.4.8 | 83.7 | 18523 | 17557 | 5.22 | 169 | 12 | 85 | 610 | 1252 | 10263 | 6042 |
| sphinxbase-0.3 | 121.9 | 908 | 887 | 2.31 | 24 | 0 | 5 | 41 | 39 | 662 | 186 |
| archimedes-0.7.0 | 0.8 | 2251 | 2146 | 4.66 | 6 | 0 | 1 | 15 | 5 | 1078 | 1063 |
| polymorph-0.4.0 | 1.3 | 10 | 8 | 20.00 | 0 | 0 | 0 | 0 | 1 | 6 | 1 |
| nkain-1.3 | 2.5 | 89 | 88 | 1.12 | 0 | 0 | 0 | 0 | 0 | 59 | 29 |
| stripcc-0.2.0 | 2.5 | 88 | 77 | 12.50 | 8 | 0 | 0 | 0 | 2 | 49 | 26 |
| ncompress-4.2.4 | 3.8 | 64 | 58 | 9.38 | 0 | 0 | 0 | 0 | 1 | 33 | 24 |
| barcode-0.96 | 4.2 | 440 | 408 | 7.27 | 0 | 0 | 0 | 0 | 2 | 285 | 121 |
| combine-0.3.3 | 10.0 | 454 | 407 | 10.35 | 9 | 0 | 0 | 2 | 9 | 295 | 103 |
| gnuchess-5.05 | 10.6 | 1600 | 1503 | 6.06 | 40 | 0 | 10 | 38 | 90 | 782 | 631 |
| industryApp 1 | 3.4 | 326 | 266 | 18.40 | 0 | 0 | 0 | 20 | 7 | 148 | 111 |
| industryApp 2 | 18.0 | 163 | 162 | 0.61 | 1 | 0 | 0 | 5 | 14 | 112 | 36 |
| industryApp 3 | 18.1 | 1111 | 1007 | 9.36 | 1 | 0 | 0 | 31 | 16 | 800 | 191 |
| industryApp 4 | 30.9 | 2974 | 2541 | 14.56 | 1 | 11 | 44 | 592 | 167 | 1675 | 699 |
| Total | 453.2 | 33162 | 31016 | 6.47 | 297 | 23 | 176 | 1443 | 2024 | 18180 | 10812 |

FIG. 8

METHOD AND SYSTEM FOR REPOSITIONING OF A PLURALITY OF STATIC ANALYSIS ALARMS

CROSS-REFERENCE TO RELATED APPLICATIONS AND PRIORITY

The present application claims priority from Indian non-provisional specification no. 201821023655 filed on 25 Jun. 2018, the complete disclosure of which, in its entirety is herein incorporated by references.

TECHNICAL FIELD

The disclosure herein generally relates to the field of static analysis alarms generated from static analysis of an application code and, more particularly, to a system and a method for repositioning of a plurality of static analysis alarms in application code.

BACKGROUND

Testing is a process of validating and verifying if a software program or application or product meets the expected business and technical requirements. A widely used technique in practice for ensuring software program quality and reliability is static analysis, wherein a software program or application code is analyzed to detect defects without actually executing the program or application code. During static analysis, an application code is analyzed using static analysis tools, wherein the tools generate one or more static analysis warnings/alarms along with reporting of safe and error program points in the application code. A static analysis alarm generated by static analysis tools may or may not represent a defect/error, and it is a warning to the user denoting a potential defect. The alarms generated are reported to user by the static analysis tools to decide the safety at the program points in the application code corresponding to the warnings.

In practice, a large number of static analysis alarms are generated and most of them are falsely generated due to the approximations used by the static analysis tools. The falsely generated static analysis alarms are referred to as false positives, because they do not represent a defect. Further, the task of classifying the generated static analysis alarms into false positives and true defects/errors is often manual, very tedious and costly. The large number of static analysis alarms generated and the cost involved in classifying the generated static analysis alarms manually have been recognized as major concerns in adoption of static analysis tools in practice. A few existing methods group similar or related static analysis alarms together and represent each group as a single alarm. However, these methods to grouping of static analysis alarms sometimes fail to group alarms related by the same variables or causes, and this failure results in redundancy in reporting of the static analysis alarms.

Further traditional static analysis tools report static analysis alarms at locations where run-time errors are likely to occur. Since a static analysis alarm is reported where run-time error is likely to occur, the user has to traverse the application code backward from the reported alarm program point to the causes of the static analysis alarm to identify whether the static analysis alarm represents an error or not. Furthermore, the traversal process can be a daunting task due to the large size and complexity of industrial application code.

SUMMARY

Embodiments of the disclosure present technological improvements as solutions to one or more of the above-mentioned technical problems recognized by the inventors in conventional systems. For example, in one embodiment, a system and a method for repositioning of a plurality of static analysis alarms is provided. The proposed repositioning techniques, reposition each of the static analysis alarms from the set of static analysis alarms up or down the application code from the program points of their original reporting, for reducing the number of static analysis alarms reported or for reporting them closer to their causes or for both the objectives. Further, the repositioning techniques ensure that the repositioning of the set of static analysis alarms is without affecting the errors uncovered by them. Further traceability links between a repositioned static analysis alarm and its corresponding static analysis alarm(s) are also maintained.

In another aspect, a method for repositioning of a plurality of static analysis alarms is disclosed. The method further comprises providing an application code as an input to a static analyzer module. Further the method comprises performing static analysis on the application code by the static analyzer module to generate a set of static analysis alarms, wherein the set of static analysis alarms detect errors in the application code. Further the method performs intermediate repositioning of the set of static analysis alarms, wherein each static analysis alarm in the set of static analysis alarms is temporarily repositioned upward at highest program points in the application code without affecting errors detected by the set of static analysis alarms. Further the method comprises computing traceability links between the intermediate repositioned static analysis alarms and their corresponding static analysis alarms from the set of static analysis alarms. Further the method comprises performing refinement of the intermediate repositioning. Further the method comprises computing traceability links between the refined intermediate repositioned static analysis alarms and their corresponding static analysis alarms from the set of static analysis alarms. Further the method comprises performing a set of final repositioning techniques on the set of refined intermediate repositioned static analysis alarms to obtain the final repositioning of the set of static analysis alarms. Further the method comprises computing traceability links between the final repositioned static analysis alarms and their corresponding static analysis alarms from the set of static analysis alarms. And finally the method comprises displaying the set of final repositioned static analysis alarms.

In another aspect, a system for repositioning of a plurality of static analysis alarms, the system comprising a memory storing instructions and one or more modules, one or more communication interfaces and one or more hardware processors coupled to the memory via the one or more communication interfaces, wherein the one or more hardware processors are configured by the instructions to execute the one or more modules further comprising a static analyzer module for receiving an application code as an input and performing static analysis on the received application code to generate a set of static analysis alarms, wherein the set of static analysis alarms detect errors in the application code. The system further comprising an intermediate repositioning module for performing intermediate repositioning of the set of static analysis alarms, wherein each static analysis alarm in the set of static analysis alarms is temporarily repositioned upward at highest program points in the application code without affecting errors detected by the set of static analysis alarms. The system further comprising a traceability links module for computing traceability links between the intermediate repositioned static analysis alarms and their corresponding static analysis alarms from the set of static analysis alarms. The system further comprising a repositioning refinement module for performing refinement of the intermediate repositioning. The system further comprising a traceability links module for computing traceability links between the refined intermediate repositioned static analysis alarms and their corresponding static analysis alarms from the set of static analysis alarms. The system further comprising a final repositioning module for performing a set of final repositioning techniques on the set of refined intermediate repositioned static analysis alarms to obtain the final repositioning of the set of static analysis alarms. The system further comprising a traceability links module for computing traceability links between the final repositioned static analysis alarms and their corresponding static analysis alarms from the set of static analysis alarms. The system further comprising a communication interfaces for displaying the set of final repositioned static analysis alarms.

In yet another aspect, a non-transitory computer-readable medium having embodied thereon a computer readable program, wherein the computer readable program, when executed by one or more hardware processors, causes an application code to be provided as an input to a static analyzer module. Further the program comprises performing static analysis on the application code by the static analyzer module to generate a set of static analysis alarms, wherein the set of static analysis alarms detect errors in the application code. Further the program performs intermediate repositioning of the set of static analysis alarms, wherein each static analysis alarm in the set of static analysis alarms is temporarily repositioned upward at highest program points in the application code without affecting errors detected by the set of static analysis alarms. Further the program comprises computing traceability links between the intermediate repositioned static analysis alarms and their corresponding static analysis alarms from the set of static analysis alarms. Further the program comprises performing refinement of the intermediate repositioning. Further the program comprises computing traceability links between the refined intermediate repositioned static analysis alarms and their corresponding static analysis alarms from the set of static analysis alarms. Further the program comprises performing a set of final repositioning techniques on the set of refined intermediate repositioned static analysis alarms to obtain the final repositioning of the set of static analysis alarms. Further the program comprises computing traceability links between the final repositioned static analysis alarms and their corresponding static analysis alarms from the set of static analysis alarms and finally the method comprises displaying the set of final repositioned static analysis alarms.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5 illustrates a first exemplary application code, in accordance with some embodiments of the present disclosure.

FIG. 6 illustrates a second exemplary application code, in accordance with some embodiments of the present disclosure.

FIG. 7 illustrates a third exemplary application code, in accordance with some embodiments of the present disclosure.

FIG. 8 is a table describing exemplary applications analyzed using a commercial static analysis tool.

DETAILED DESCRIPTION OF EMBODIMENTS

Figure 1:
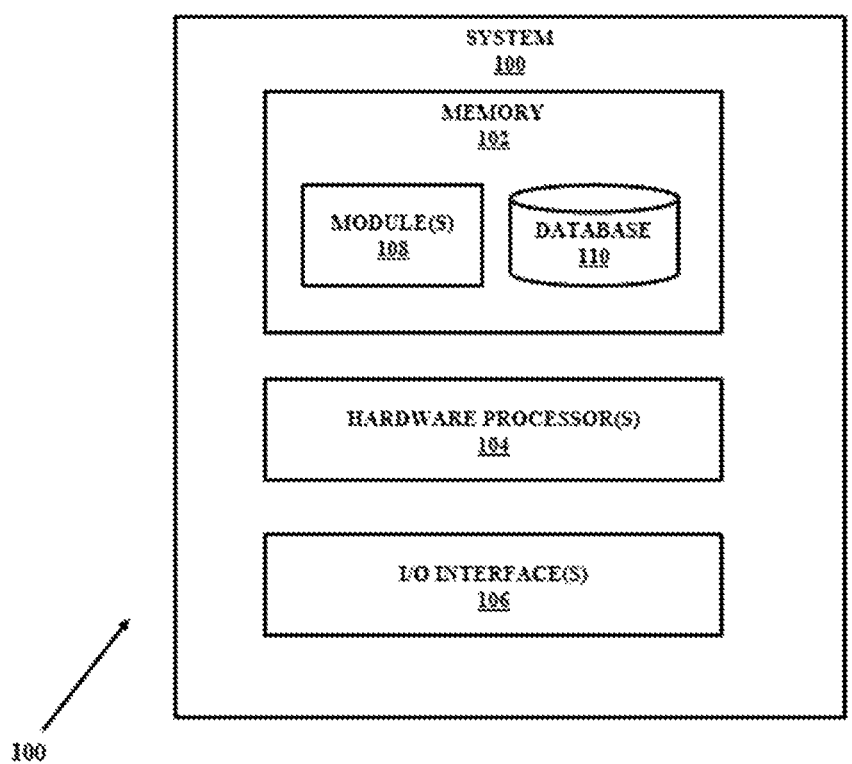
FIG. 1 illustrates an exemplary block diagram of a system for repositioning of a plurality of static analysis alarms in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Glossary—Terms Used in the Embodiments

The expression "application code" or "application" or "program" or "program code" in the context of the present disclosure refers to a software code that is given as an input. Notions related to control flow graph (CFG) that would be used in embodiments of the present disclosure are defined, wherein a CFG of a program is a directed graph represented as (N, E). Further N is a set of nodes representing program statements (like assignments and controlling conditions) and E is a set of edges where an edge $(n_1, n_2)$ represents a possible flow of program control from $n_1 \in N$ to $n_2 \in N$ without any intervening node. Further for a node n, the predecessors of n are represented as pred(n) and the successors of n are represented as succ(n); the program point corresponding to the entry of n is represented as entry(n), and the program point corresponding to the exit of n is represented as exit(n). Furthermore, a node of a program statement at line m is represented as $n_m$.

Further, notions related to static analysis alarms that would be used in embodiments of the present disclosure are defined, wherein a represents the set of static analysis alarms generated by the static analyzer module and are input for the repositioning; $\phi_p$ represents a static analysis alarm b belonging to set a and is reported at a program point p; alarm condition of a static analysis alarm $\phi$ represents the condition to be checked by the user during manual classification of the static analysis alarm, wherein the static analysis alarm $\phi$ is a false positive when the alarm condition is satisfied. The alarm condition of a static analysis alarm $\phi$ is represented as cond($\phi$). Furthermore, the mathematical symbol ø is used to represent an empty set wherever required during describing the exemplary embodiments.

An alarm condition c is represented as "available alarm condition" at a program point p, if every path from the program entry to p contains a static analysis alarm $\phi_q$ with c as its alarm condition, and the point q is not followed by a definition of any operand of c on any path from q to p. A short notation "avcond" represents an available alarm condition, and notation "avconds" represents a set of available alarm conditions.

An alarm condition c is represented as "anticipable alarm condition" at a program point p, if every path from p to the program exit contains a static analysis alarm $\phi_q$ with c as its alarm condition, and the point q is not preceded by a definition of any operand of c on any path from p to q. A short notation "antcond" represents an anticipable alarm condition, and notation "antconds" represents a set of anticipable alarm conditions.

A "safe repositioning" (upward or downward movement) of a set of alarms S to a program point p occurs when $C_p \Leftrightarrow \Lambda_{\phi \in S}$ cond($\phi$) where $C_p$ is the repositioned static alarm condition: when the alarm condition of the repositioned alarm ($C_p$) is equivalent to the conjunction of the alarm conditions of the static analysis alarms in S that were repositioned, the repositioning performed does not affect the errors detected by the set of alarms.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for repositioning of a plurality of static analysis alarms according to an embodiment of the present disclosure. The proposed system repositions each of the static analysis alarms in the set of static analysis alarms up or down the application code from the program points of their original reporting, for reducing the number of static analysis alarms reported or for reporting them closer to their causes or for both the objectives. Further, the repositioned techniques performed by the system also ensure that the repositioning of the set of static analysis alarms is without affecting the errors uncovered by them. Further traceability links between a repositioned static analysis alarm and its corresponding static analysis alarm(s) is also maintained.

In an embodiment, the system 100 includes one or more processors 104, communication interface(s) or input/output (I/O) interface(s) 106, and one or more data storage devices or a memory 102 operatively coupled to the one or more processors 104. The memory 102 comprises one or more modules 108 and a database 110. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication or I/O interfaces 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication or I/O interfaces can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
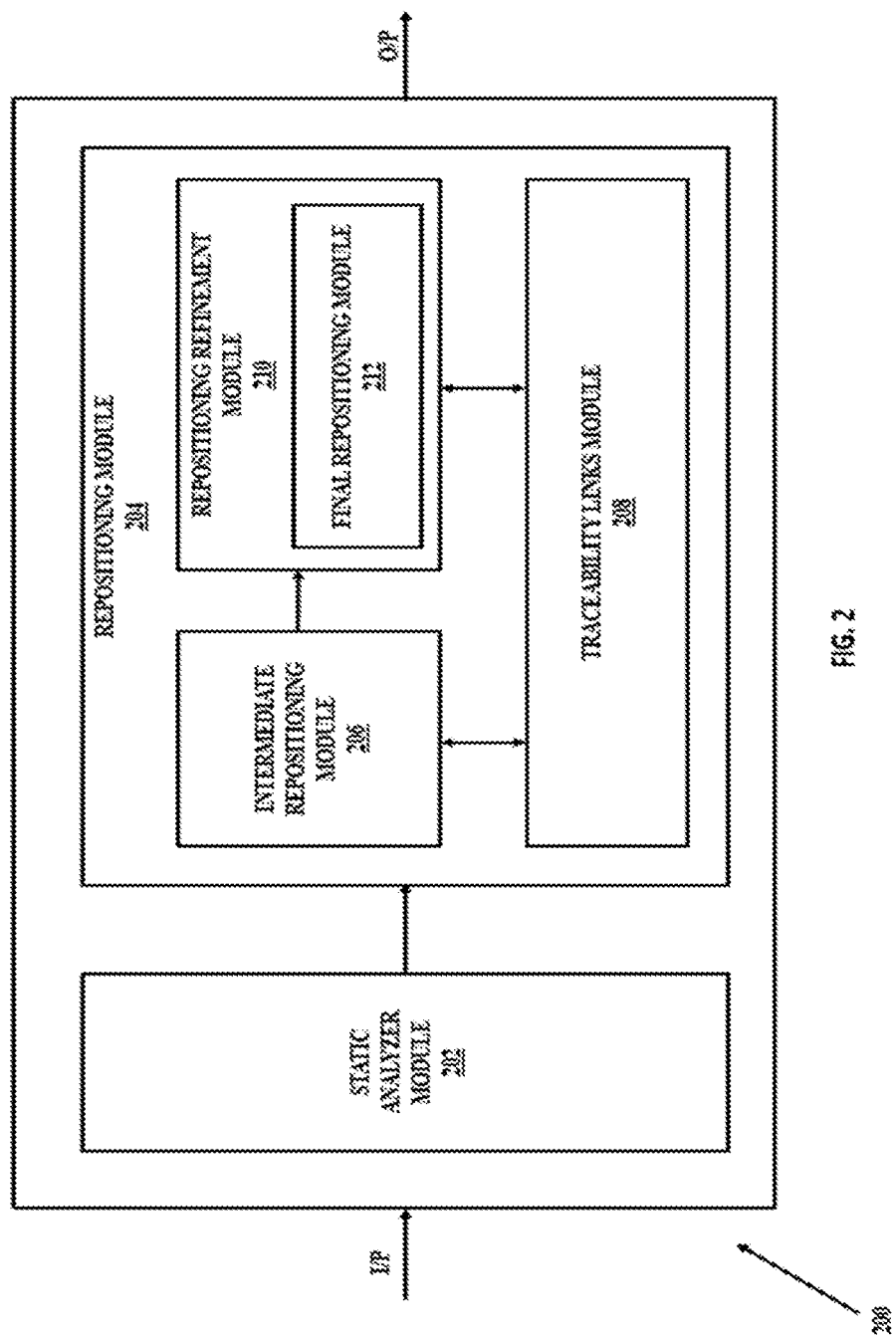
FIG. 2 is a functional block diagram of various modules stored in module(s) of a memory of the system of FIG. 1 in accordance with some embodiments of the present disclosure.

FIG. 2, with reference to FIG. 1, is a block diagram of various modules 108 stored in the memory 102 of the system 100 of FIG. 1 in accordance with an embodiment of the present disclosure. In an embodiment of the present disclosure, the system 100, comprises a static analyzer module 202 and a repositioning module 204. The repositioning module 204 further comprises of an intermediate repositioning module 206, a traceability links module 208, a repositioning refinement module 210 and a final repositioning module 212, wherein the said modules are implemented as at least one of a logically self-contained part of a software program, a self-contained hardware component, and/or, a self-contained hardware component with a logically self-contained part of a software program embedded into each of the hardware component that when executed perform the above method described herein.

According to an embodiment of the disclosure, the system 100 comprises the static analyzer module 202 that is configured for receiving an application code as an input. Further static analysis is performed on the received application code to generate a set of static analysis alarms. The set of static analysis alarms generated detect errors in the application code. The static analyzer module 202 may be a tool known in art such as Frama-C, Cppcheck, or Clang.

According to an embodiment of the disclosure, the system 100 further comprises the intermediate repositioning module 206 within the repositioning module 204. The intermediate repositioning module 206 is configured to perform intermediate repositioning of a set of static analysis alarms, wherein each static analysis alarm in the set of static analysis alarms is temporarily repositioned upward at highest program points in the application code without affecting errors detected by the set of static analysis alarms. In an embodiment, the lines of a code shown in FIG. 5 illustrate an application code CA.

In an embodiment, the static analyzer module 202 generates six static analysis alarms from the illustrated application code CA, wherein the static analysis alarms correspond to two commonly checked categories of errors, namely array index out of bounds (AIOB) and division by zero (ZD). The static analysis alarms are reported at the locations where the two types of the run-time errors are likely to occur. Further notations $A_n$ and $Z_n$, respectively are used to denote a static analysis alarm at line n corresponding to AIOB and ZD error categories.

In an embodiment, during intermediate repositioning every static analysis alarm φ reported at p is safely hoisted (repositioned upward in the application code) at the highest hoisting point along every path that reaches p, wherein hoisting of a static analysis alarm represents repositioning of the static analysis alarm upward in the application code. The highest hoisting point on a path is identified as the program point $q_h$ such that cond(φ) is anticipable alarm condition at $q_h$ but the same condition is no longer anticipable alarm condition at any program point just before $q_h$. Thus, intermediate repositioning results in hoisting a static analysis alarm condition closer to its cause points but also in hoisting the alarm condition at multiple locations. For example, the static analysis alarm condition i≥0 && i≤4 of static analysis alarms $A_{17}$ and $A_{19}$ in the illustrated application code CA gets hoisted at two locations: exit($n_6$) and exit($n_8$). This intermediate repositioning discards the third hoisting possible at entry ($n_{13}$) as the condition hoisted at this point always evaluates to true.

The intermediate repositioning technique includes performing anticipable alarm conditions analysis using one or more code analysis techniques such as static analysis, data flow analysis, abstract interpretation and so on, and performing the intermediate repositioning using the anticipable alarm conditions analysis results. During anticipable alarm conditions analysis, anticipable alarm conditions (antconds) are computed from the set of static analysis alarms α by performing the analysis in backward direction. The computation of the antconds is illustrated by referring to a backward data flow analysis. For every antcond c computed at any program point p, the related original static analysis alarms α'⊆α (also represented as rel-alarms) which contribute to anticipability of c at that point are also computed. Further the rel-alarms are used to compute traceability links between a repositioned static analysis alarm (also represented as repositioned condition) and its corresponding static analysis alarms from the set of static analysis alarm(s) a generated originally by the static analyzer module 202. In an embodiment if P represents set of all program points, V represents a set of variables in the program, C is a set of all conditions that can be formed using program variables, constants, and arithmetic and logical operators. Further a tuple (c, φ) is used to denote an antcond c∈C along with one of its rel-alarms φ∈α Thus, the values computed by this backward data flow analysis (antconds analysis) at a program point are given by a subset of $L_b$=C×α

For a given set S⊆$L_b$, the following can be defined:
(1)condsIn(S)={c|<c, φ>∈S}, returns all antconds in S;
(1)tuplesOf(c, S)={<c, φ>|<c,φ>∈S}, returns all tuples of a given antcond c in S.

The antconds analysis computes subsets of $L_b$ flow-sensitively at every program point p∈P. Further lattice of these values computed is (B,$\Pi_B$), where B is the powerset of $L_b$. Further to compute antconds with their corresponding rel-alarms, the meet $FI_B$ is defined as the following:
Given X, Y∈B, and $$X\Pi_B Y = U_{c\in(condsIn(X)\cap condsIn(Y))} tuplesOf(c,X) \cup tuplesOf(c,Y) \quad (1)$$

Data flow equations of the antconds analysis in intra procedural setting for intermediate repositioning are illustrated below;

Let $m, n \in N$; $c, c' \in C$; $\Phi, \Phi' \in \alpha$; $u, v \in V$ $t \in$ Constants; and $X, Y \in B$ $$AntOut_n = \begin{cases} \emptyset & n \text{ is End node} \\ \Pi_{B_{m \in succ(n)}} AntIn_m & \text{otherwise} \end{cases} \quad (2)$$

$$AntIn_n = Gen_n(AntOut_n) \cup (AntOut_n \setminus Kill_n(AntOut_n)) \quad (3)$$

$$Kill_n(X) = \{\langle c, \Phi \rangle \in X \mid n \text{ contains a defination of an operand of } c\} \quad (4)$$

$$Gen_n(X) = Gen'_n(X) \cup DepGen_n(Kill_n(X)) \quad (5)$$

$$Gen'_n(X) = \begin{cases} \{process(\Phi, condsIn(X))\} & n \text{ has an alarm } \Phi \\ & \text{reported for it} \\ \emptyset & \text{otherwise} \end{cases} \quad (6)$$

$$process(\Phi, Y) = \begin{cases} \langle c, \Phi \rangle & c \in Y, \quad c \Rightarrow cond(\Phi) \\ \langle cond(\Phi), \Phi \rangle & \text{otherwise} \end{cases} \quad (7)$$

$$DepGen_n(X) = \begin{cases} \{\langle wprecond(n, c), \Phi \rangle \mid \langle c, \Phi \rangle \in X\} & n:u = v; \\ & \text{or } n:u = v \oplus t; \\ & \text{or } n:u = t \oplus v \\ \emptyset & \text{otherwise} \end{cases} \quad (8)$$

$AntIn_n$ and $AntOut_n$, in Equations 3 and 2, denotes antconds computed by the antconds analysis at the entry and exit of a node n respectively. Further, Equation 6 shows processing of every static analysis alarm t reported for the statement of a node n, to generate cond(φ) as an anticipable alarm condition. Further, Equation 7 denotes that the static analysis alarm condition cond(φ) is not generated as an antcond when it is implied by an antcond $c_{in}$ flowing in at the node n. However in the illustrated case, the static analysis alarm is associated with $c_{in}$. Further, Equation 8 denotes computation of antconds transitively at a node n. The equation assumes function wprecond (n, $C_p$) to return the weakest precondition for (1) the statement of a given node n, and (2) a postcondition $C_p$. The ⊕ is used to denote an arithmetic operator in {+, −, /, *}. For simplicity, only a few cases of the statements associated with the node n are shown in Equation 8. During intermediate repositioning of static analysis alarms, alarm condition of every static analysis alarm is temporarily hoisted at the highest program point in every path reaching to the alarm program point. The highest hoisting point is identified as the point before which the alarm condition is no longer anticipable. Further, two cases of identifying the highest hoisting points is discussed below;

Case 1: A static analysis alarm condition c anticipable at entry(n) is not anticipable at exit(m) when m is a predecessor of n and also a branching node (i.e. the statement of m is a controlling condition). Further this case occurs when c is not anticipable through one of the branches coming out of m, other than the branch having node n. In this case, the antcond c is hoisted at the entry(n). Alternatively, the antconds to be hoisted at entry(n) are expressed by the equation 9 shown below;

$$Hoist_{entry(n)} = condsIn(AntIn_n) \setminus \bigcap_{m \in pred(n)} condsIn(AntOut_m) \quad (9)$$

Considering the illustrated application code CA, condition i≥0 && i≤4 of $A_{17}$ (and $A_{19}$) is anticipable at the entry($n_{13}$) but not at the exit($n_4$), and $n_4$ is predecessor of $n_{13}$. Thus, the condition is hoisted at the entry($n_{13}$).

Case 2: A condition c anticipable at exit(n) is not anticipable at the entry(n) when (1) the node n contains a definition of an operand of c i.e. anticipability of c is killed by n, and (2) the node n does not generate any antcond transitively from c. In this case, the condition c is hoisted at the exit(n). That is, the alarm conditions to be hoisted at exit(n) are expressed by the equation 10 shown below;

$$\text{Hoist}_{exit(n)} = \{c | c \in \text{condsIn}(\text{Kill}_n(\text{AntOut}_n)), \text{DepGen}_n(\{c\}) = \varnothing\} \quad (10)$$

Considering the illustrated application code CA, the alarm condition of $A_{17}$ (and $A_{19}$), $i \geq 0$ && $i \leq 4$, is anticipable at the exit $n_6$ but not at the entry $n_6$ and $n_6$ does not generate anticipable alarm conditions transitively. Thus, the condition is hoisted at the exit($n_6$). Similarly, this condition is also hoisted at the exit($n_8$).

Further during intermediate repositioning if hoisting is found to be redundant, it is discarded. The non-redundant hoisting are defined using the following equations 11 and 12, where alwaysTrue(c,p) is true only if the condition c always holds at p as shown below;

$$\overline{\text{Hoist}}_{entry(n)} = \{c | c \in \text{Hoist}_{entry(n)}, \text{alwaysTrue}(c, \text{entry}(n)) \neq \text{true}\} \quad (11)$$

$$\overline{\text{Hoist}}_{exit(n)} = \{c | c \in \text{Hoist}_{exit(n)}, \text{alwaysTrue}(c, \text{exit}(n)) \neq \text{true}\} \quad (12)$$

Considering the illustrated application code CA, as an example for redundant hoisting, the hoisting of alarm condition of $A_{17}$ and $A_{19}$ at the entry($n_{13}$) is redundant where the hoisted alarm condition $i \geq 0$ && $i \leq 4$ always holds at the hoisting location due to the value 0 assigned to i at line 2.

Further, the intermediate repositioning of static analysis alarms hoisting at the entry and exit of all the nodes is performed by processing every node $n \in N$ using the equations 11 and 12. Considering the illustrated application code CA as an example for intermediate repositioning;
(i) $i \geq 0$ && $i \leq 4$ is hoisted at the exit ($n_6$) and exit ($n_8$), with both $A_{17}$ and $A_{19}$ as its rel-alarms.
(ii) $n \neq 0$ is hoisted at the exit ($n_{26}$) (resp. entry ($n_{29}$)) with $Z_{29}$ (resp. $Z_{29}$) as its rel-alarm.
(iii) $j \geq 0$ && $j \leq 4$ is hoisted at the exit ($n_{34}$) with A37 as its relalarm. Furthermore, due to the increment operation at line 38 and transitivity, $j \geq -1$ && $j \leq 3$ also gets hoisted at the exit ($n_{34}$) with A39 as its rel-alarm. The two conditions hoisted in each of the cases (i) and (ii) belong to different branches of an if statement and are candidates for merging (sinking) during the refinement step. In the case (iii), the two conditions repositioned at the same point get merged through their conjunction during the refinement step.

According to an embodiment of the disclosure, the system 100 further comprises the traceability links module 208 within the repositioning module 204. The traceability links module 208 is configured to compute traceability links at multiple levels such as during intermediate repositioning, refinement of the intermediate repositioning and the final repositioning.

Further the traceability links module 208 is configured to compute traceability link between the intermediate repositioned static analysis alarms and their corresponding static analysis alarms from the set of static analysis alarms, wherein the traceability links between the intermediate repositioned static analysis alarms and static analysis alarms in the set of static analysis alarms are computed based on the anticipable alarm conditions and their corresponding rel-alarms (related original static analysis alarms). Further for each antcond c in $S \subseteq L_b$, the corresponding rel-alarms are expressed as relAlarms(c, S) = $\{\phi | <c, \phi> \in S\}$ to return the rel-alarms of an antcond c. The traceability links are generated from a hoisted condition c in $\text{Hoist}_{entry(n)}$ (resp. $\text{Hoist}_{exit(n)}$) to its corresponding rel-alarms given by relAlarms(c,$\text{AntIn}_n$) (resp. relAlarms(c,$\text{AntOut}_n$)).

According to an embodiment of the disclosure, the system 100 further comprises the repositioning refinement module (210) within the repositioning module 204. The repositioning refinement module (210) is configured for performing refinement of the intermediate repositioning. During the refinement of intermediate repositioning, the intermediate repositioned static analysis alarms are merged or not merged at a highest point later in the application code CA based on computing available alarm conditions with their related original static analysis alarms based on the intermediate repositioned static analysis alarms and their traceability links to the static analysis alarms, using one or more code analysis techniques such as static analysis, data flow analysis, abstract interpretation and so on.

Further the available alarm conditions (avconds) computed based on one or more techniques are used to refine the intermediate repositioning and further to obtain the final repositioning of the set of static analysis alarms. Considering the illustrated application code CA, where c is an avcond computed at a program point p from the conditions hoisted in the intermediate repositioning, and $p_r$ be the single program point associated with c. Further during the refinement of the intermediate repositioning, location $p_r$ associated with c is computed as the highest program point at which c is available and whose node dominates the node of p. Further the program point $p_r$ is referred to as repositioning location of c. Further the avconds are computed transitively, an avcond c computed at a point p can be transformed version of a condition $c_r$ available at $p_r$ and c is transitively computed from $c_r$ along a path from $p_r$ to p. Further the condition $c_r$ at $p_r$ is referred to as repositioning condition of c. Thus, due to the transitivity in avconds computation, the repositioning location $p_r$ and repositioning condition $c_r$ are computed for every avcond identified at any program point. Further the values, $c_r$ and $p_r$, are used later to implement the final repositioning. Further an avcond computed at any point is with exactly one repositioning location $p_r$ and one repositioning condition $c_r$. Further, computing repositioning condition $c_r$ for an avcond c is not required if avconds are not to be computed transitively (because in this case, $c_r$ is same as c). Further the associated values, $c_r$ and $p_r$, for an avcond are computed depending on the hoisted conditions and locations in the intermediate repositioning, rather than as dependent on the original static analysis alarms input for their repositioning. Computation of the avconds along with their associated values $c_r$ and $p_r$ is illustrated using a forward data flow analysis (avconds analysis). Considering an example, where P be the set of all program points and C be the set of all conditions that can be formed using the program variables, constants, and arithmetic and logical operators. An avcond $c \in C$ to its associated repositioning condition $c_r \in C$ and location $p_r \in P$ is mapped using function f: $C \rightarrow C \times P$. Further the condition c with the associated values is expressed as tuple (c, $c_r$, $p_r$). Thus, the forward analysis (avconds analysis) at a program point p computes a subset of $L_f$, Where $L_f = \{<c, c', p> | c \in C_p, f(c) = <c', q>\}$
$C_p$ is a set of avconds at p.
For a given set $S \subseteq L_f$ the following functions are defined:
condsIn(S) = $\{c | <c, c_r, p_r> \in S\}$ returns all avconds in S.
repCond(c, S) = $c_r | <c, c_r, p_r> \in S$ returns the repositioning condition of a given avcond c in S repLoc(c, S)=$p_r$|<c, $c_r,p_r$>∈S returns the repositioning location of a given avcond c in S.

Further as avconds analysis computes subsets of $L_f$ flow sensitively at every program point p∈P, the lattice of these values is denoted by (F=$2^{L_f}$, $\Pi_F$). Further $^n\Pi_F$ is used to denote the meet of data flow values at the entry of a join node n. The meet operation is as shown below, Given X, Y∈F $$X \ ^n\Pi_F \ Y = \bigcup_{c \in (condsIn(X) \cap condsIn(Y))} \{mergeInfo(c, entry(n), X, Y)\} \quad (13)$$

$$mergeInfo(c, p_m, X, Y) = \begin{cases} \langle c, c_r, p_r \rangle & \langle c, c_r, p_r \rangle \in X, \langle c, c'_r, p'_r \rangle \in Y, \\ & p_r = p'_r \\ \langle c, c_r, p_m \rangle & \text{otherwise} \end{cases}$$

The meet operation is idempotent, commutative, and associative. For simplicity of the equation, it is assumed that the join node n corresponding to a meet operation is known when the meet is performed. At a meet point entry (n), the above meet operation updates the repositioning condition and location of an avcond c respectively to c and entry (n), only if the repositioning locations of c flowing-in via the two different paths at the meet point are different. In the other case, the values associated with c remain unchanged. Data flow equations of the avconds analysis computing the avconds transitively in intra procedural setting for refinement of the intermediate repositioning is shown below, wherein $AvIn_n$ and $AvOut_n$ in equations 14 and 15 denote avconds computed with their associated values, respectively, at the entry and exit of a node n;

Let $m, n \in N; u, v \in V, c, c', c_r \in C; p_r \in P$;

$t \in$ Constants; and $X, Y \in F$ $$AvIn_n = \begin{cases} \emptyset & n \text{ is Start node} \\ ^n\Pi_{F \ m \in pred(n)} \ AvOut_m & \text{otherwise} \end{cases} \quad (14)$$

$$AvOut_n = Gen_{exit(n)} \cup AvOut'_n \quad (15)$$

$$Gen_{exit(n)} = \{\langle c, c, exit(n) \rangle \overline{c} \in \overline{Hoist}_{exit(n)}\} \quad (16)$$

$$AvOut'_n = (AvIn'_n \backslash Kill_n(AvIn'_n)) \cup (DepGen(AvIn'_n))$$

$$AvIn'_n = AvIn_n \cup Gen_{entry(n)}(AvIn_n)$$

$$Gen_{entry(n)}(X) = \quad (17)$$
$$\{\langle c, c, entry(n) \rangle \mid c \in \overline{Hoist}_{entry(n)}, \langle c', c_r, p_r \rangle \in X, c' \neq > c\}$$

$$Kill_n(X) = \quad (18)$$
$$\{\langle c, c_r, p_r \rangle \in X \mid n \text{ contains a defination of an operand of } c\}$$

$$DepGen_n(X) = \quad (19)$$
$$\begin{cases} \{\langle postcond(n, c), c_r, p_r \rangle \mid \langle c, c_r, p_r \rangle \in X)\} & n:u = v \\ & \text{or } n:u = v \oplus t; \\ & \text{or } n:u = t \oplus v \\ \emptyset & \text{otherwise} \end{cases}$$

Figure 4:
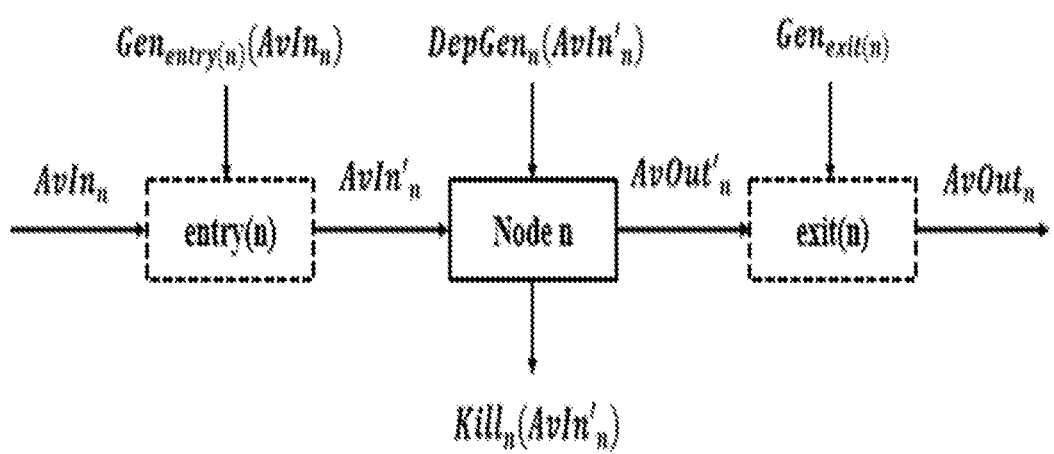
FIG. 4 is an exemplary flow diagram illustrating one of the computations performed during refinement of the intermediate repositioning in accordance with some embodiments of the present disclosure.

Further, FIG. 4 illustrates the computing of $AvOut_p$. Further, equations 16 and 17 indicate that an avcond is generated for every condition hoisted in the intermediate repositioning. Further the Equation 17 does not generate an avcond for c∈$Hoist_{entry(n)}$ when some other avcond in $AvIn_n$ implies c. However, such implication handling is not needed in Equation 16, because during the intermediate repositioning the antconds are hoisted at the exit of a node only when the node stops anticipability of those conditions. Further equation 19 describes transitive computation of the avconds, wherein function postcond(n, $c_p$) returns the strongest postcondition for the statement of a given node n, and a given precondition $c_p$. Further the said equation does not update the repositioning condition and location of any of the available alarm conditions. Thus, the associated values of an avcond c are updated only when c is generated (equations 16 or 17), or the meet operation is performed.

Further the traceability links module 208 is configured to compute traceability links between the refined intermediate repositioned static analysis alarms and their corresponding static analysis alarms from the set of static analysis alarms. Further, the traceability links between the refined intermediate repositioned static analysis alarms and the static analysis alarms in the set of static analysis alarms are computed based on the available alarm conditions and their related original static analysis alarms. A forward traceability links analysis is performed during refinement of intermediate repositioning, wherein subsets of C×α are computed flow-sensitively at every program point and the meet operation of the forward traceability links analysis is similar to the meet operation shown by Equation 1.

The data flow equations of the forward traceability links analysis performed during the refinement of intermediate repositioning are shown below, Let $m, n \in N; u, v \in V; c, c' \in C; \Phi, \Phi' \in \alpha$;

$t \in$ Constants; and $X, Y \in B$ $$fwdIn_n = \begin{cases} \emptyset & n \text{ is Start node} \\ \Pi_{B_{m \in pred(n)}} \ fwdOut_m & \text{otherwise} \end{cases}$$

$$fwdOut_n = fwdOut'_n \cup Gen_{exit(n)}$$

$$fwdOut'_n = (fwdIn'_n \backslash Kill_n(fwdIn'_n)) \cup TransGen((fwdIn'_n)$$

$$fwdIn'_n = fwdIn_n \cup Gen_{entry(n)}(fwdIn_n)$$

$$Gen_{entry(n)}(X) =$$
$$\begin{cases} \{\langle c, \Phi \rangle\} & c \in \overline{Hoist}_{entry(n)}, \langle c', \Phi' \rangle \in X, \\ & c' \neq > c, \Phi \in relAlarms(c, AntIn_n) \\ \{\langle c', \Phi \rangle\} & c \in \overline{Hoist}_{entry(n)}, \langle c', \Phi' \rangle \in X \\ & c' \Rightarrow c, \Phi \in relAlarms(c, AntIn_n) \end{cases}$$

$$Kill_n(X) = \quad (20)$$
$$\{\langle c, \Phi \rangle \in X \mid n \text{ contains a defination of an operand of } c\}$$

$$TransGen_n(X) = \begin{cases} \begin{Bmatrix} \langle postcond(n, c), \Phi \rangle \\ \mid \langle c, \Phi \rangle \in X \end{Bmatrix} & n:u = v; \\ & \text{or } n:u = v \oplus t; \\ & \text{or } n:u = t \oplus v; \\ \emptyset & \text{otherwise} \end{cases}$$

$$TransGen_{n_n}(X) =$$
$$\begin{cases} \{\langle postcond(n, c), \Phi \rangle \mid \langle c, \Phi \rangle \in X\} & n:u = v; \\ & \text{or } n:u = v \oplus t; \\ & \text{or } n:u = t \oplus v \\ \emptyset & \text{otherwise} \end{cases}$$

$$Gen_{exit(n)} = \{\langle c, \Phi \rangle \mid c \in \overline{Hoist}_{exit(n)}, \Phi \in relAlarms(c, AntOut_n)\}$$

In the above data flow equations for the forward traceability links analysis performed during the refinement of intermediate repositioning, $fwdIn_n$ and $fwdOut_n$ respectively represent the avconds computed at the entry and exit of a node n. The avconds represented by $fwdIn_n$ and $fwdOut_n$ of the forward traceability links analysis at any program point, respectively, will remain same as the avconds computed at the same program point by the equations 14 and 15 of the avconds analysis performed during refinement of the intermediate repositioning.

Computing Refined Intermediate Repositioning:

The avconds to be utilized for refinement of the intermediate repositioning are identified, wherein for every avcond c identified, wherein the repositioning condition $c_r$ of c is repositioned at the repositioning location $p_r$ of c, and traceability link is created from the repositioned condition $c_r$ to each of the rel-alarms of c. The avconds to be utilized are identified by processing every node n in the application code CA using Equations 21 and 22 wherein equations respectively compute the avconds that are no longer available immediately after entry and exit of a node n as shown below;

$$Conds_{entry(n)} = condsIn(Kill_n(AvIn'_n)) \quad (21)$$

$$Conds_{exit(n)} = condsIn(AvOut_n) \setminus \bigcap_{s \in succ(n)} condsIn(AvIn_s) \quad (22)$$

These above equations are on similar lines to two cases in intermediate repositioning. The processing of every node through the two equations ensures the following: (1) each avcond c generated at a program point p gets utilized for repositioning along every path starting at p and ending at the program exit except when it transitively results into some other avcond, and (2) the utilization along any such path is only once and it occurs at the last program point on the path where c is available. The proposed technique utilizes every condition c∈condsIn(entry(End)) for repositioning, because a few avconds like n≠0 in illustrated application code CA can reach the program end point, but not get computed by any of the equations 21 and 22 for any point. The computation of the refinement of the intermediate repositioning is illustrated using following the computations steps:

```
for node n ∈ N do
{
    for condition c ∈ Conds_entry(n) do
        reposition(c, AvIn'_n, fwdIn'_n);
    for condition c ∈ Conds_exit (n) do
        reposition(c, AvOut_n, fwdOut_n);
}
/* Special case for the program exit node */
for condition c ∈ condsIn(entry(End)) do
    reposition(c, AvIn_End, fwdIn_End);
``` where,
the function "reposition(c,X,Y)" repositions repCond(c, X) at repLoc(c, X) with its traceability links to every alarm φ'∈{φ|<c, φ>∈Y}.

According to an embodiment of the disclosure, the system 100 further comprises final repositioning module (212) within repositioning module 204. The final repositioning module (212) is configured for performing a set of final repositioning techniques on the set of refined intermediate repositioned static analysis alarms to obtain the final repositioning of the set of static analysis alarms. Further the set of final repositioning techniques include simplification of the refined intermediate repositioned static analysis alarms to obtain final repositioned static analysis alarms, elimination of redundancy from the final repositioned static analysis alarms, and performing fallback by identifying the repositioning cases that increase the overall number of static analysis alarm after the elimination of the redundancy from the final repositioned static analysis alarms.

The final repositioning using the avconds is performed in several steps as shown below, wherein each step presents each of the technique from the set of final repositioning techniques as described below.

Final Repositioning Step 1 (Simplifying Refined Intermediate Repositioned Conditions):

Further during simplifying the refined intermediate repositioned conditions, every program point is processed to simplify the conditions repositioned at that point. The simplification is performed on conjunction of the repositioned conditions that are related by the same variables. The traceability links for a condition resulting after the simplification by the traceability links module (208) are obtained by merging traceability links of the conditions that got simplified. Considering an example using the illustrated application code CA, using the avconds at the program end point (line 40), Step 1 repositions j≥0 && j≤4 and j≥−1 && j≤3 at the exit($n_{34}$) with their links respectively to $A_{37}$ and $A_{39}$. After the simplification step, these two conditions result in j≥0 && j≤3 with its traceability links to both $A_{37}$ and $A_{39}$.

Final Repositioning Step 2 (Postprocessing for Redundancy Elimination).

The repositioning resulting after the simplification step may have some redundancy. Consider an example the application code CB given in FIG. 6.

The application code CB that has three AIOB alarms reported at lines 7, 8, and 14 shown in FIG. 6. The conditions repositioned after the simplification Step 1 are at the entry ($n_6$), exit($n_{12}$), and entry($n_{18}$). These three repositioned conditions are shown as assertions at lines 5, 13, and 17, respectively. In said application code CB, the repositioning performed does not reduce the overall alarms count. Further the condition repositioned at entry($n_{18}$) (line 17) is redundant in presence of the two other repositioned conditions: the other two conditions act as dominant alarms for this condition. To improve the repositioning by eliminating such redundancy, static analysis alarms grouping techniques known in art are applied on the simplified repositioned conditions resulted after the simplification Step 1 and further the repositioned conditions that are identified as followers by the grouping techniques are discarded. Further by applying this final repositioning Step 2 to the three repositioned conditions discards the redundant repositioned condition, and reduces the overall alarms count by one.

Final Repositioning Step 3 (Postprocessing for Fallback). The repositioned static analysis conditions (static analysis alarms) obtained after Step 2 may increase the number of static analysis alarms, due to two repositioning goals impacting each other (as illustrated below in certain scenarios) or due to computation of the antconds and avconds transitively. Consider an example of illustrated application code CC shown in FIG. 7.

This illustrated application code example CC of FIG. 7 is crafted to illustrate impact of the two repositioning goals on each other. The example has one alarm $A_{17}$. Condition of this alarm, i≥0 && i≤4, is not avcond at the entry($n_{15}$). Further the condition hoisted at the entry($n_{13}$) gets discarded via Equation 11 during the intermediate repositioning, and due to this discarding the condition is not avcond at the entry($n_{13}$), and hence at the entry($n_{15}$). Thus, repositioning of $A_{17}$ results in the two conditions repositioned at the exit($n_6$) and exit($n_8$). The redundant conditions are discarded during the intermediate repositioning to report the static analysis alarms closer to their cause points. However, for the illustrated example, the discarding increases the final static analysis alarms count. In the absence of this discarding, the condition gets repositioned only at the entry($n_{15}$), without increasing the final static analysis alarms count. This indicates the two repositioning goals impact each other, i.e., reporting alarms closer to their causes might increase the number of alarms. In the post processing Step 3, situations when the number of alarms increases are identified and the repositioning in these situations is reverted (fallback approach), i.e., original static analysis alarms are reported instead of the repositioned ones.

Final Repositioning Example: Applying the set of final repositioning techniques to static analysis alarms in application code CA results in the following final repositioning. For this example, the post processing steps 2 and 3 do not change (improve) the repositioning obtained after the simplification Step 1.

(1) i≥0 && i≤4 is repositioned at the entry($n_{11}$) with its traceability links to $A_{17}$ and $A_{19}$, where the repositioning is identified by Equation 22 when applied to the exit(n11).
(2) n≠0 is repositioned at the entry($n_{32}$) with its traceability links to $Z_{27}$ and $Z_{29}$, where the repositioning is identified when entry(End) is processed as the special case.
(3) j≥0 && j≤3 is repositioned at the exit($n_{34}$) with its traceability links to $A_{37}$ and $A_{37}$.

Further the traceability links module 208 is also configured to compute traceability links between the final repositioned static analysis alarms and their corresponding static analysis alarms from the set of static analysis alarms. Further the traceability links between the final repositioned static analysis alarms and the static analysis alarms in the set of static analysis alarms are computed based on the traceability links computed between the refined intermediate repositioned alarms and the static analysis alarms in the set of static analysis alarms. Furthermore, the set of final repositioned static analysis alarms is displayed in communication or I/O interfaces (106) instead of the set of static analysis alarms, for reducing redundancy from reporting and manual inspections of the static analysis alarms from set of static analysis alarms. Furthermore the traceability links between the final repositioned static analysis alarms and their corresponding original static analysis alarms are displayed in the communication or I/O interfaces (106) only if user requests for the same.

Figure 3:
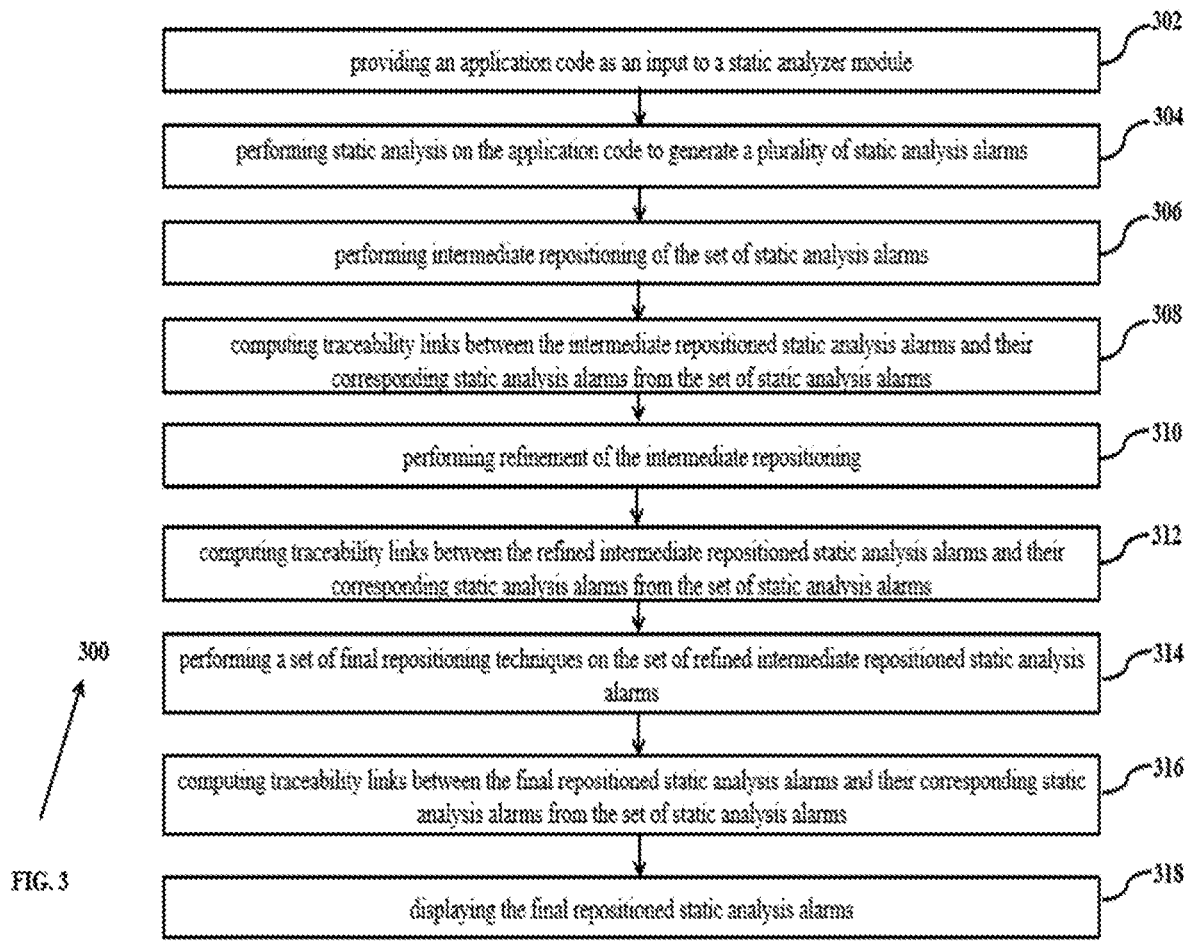
FIG. 3 is an exemplary flow diagram illustrating a method for repositioning of a plurality of static analysis alarms using the system of FIG. 1 in accordance with some embodiments of the present disclosure.

FIG. 3, with reference to FIGS. 1-2, is an exemplary flow diagram illustrating a method for repositioning of a plurality of static analysis alarms using the system 100. The steps of the method of the present disclosure will now be explained with reference to the components of the system 100 and the modules 202-212 as depicted in FIGS. 1-2, and the flow diagram. At step 302 an application code is provided as an input to a static analyzer module 202. In the next step at 304, static analysis is performed on the received application code by the static analyzer module 202 to generate a set of static analysis alarms, wherein the set of static analysis alarms detect errors in the application code.

In the next step at 306, intermediate repositioning of the set of static analysis alarms is performed in intermediate repositioning module (206), wherein each static analysis alarm in the set of static analysis alarms is temporarily repositioned upward at highest program points in the application code without affecting errors detected by the set of static analysis alarms. Further the static analysis alarms are repositioned upward closer to cause points for its generation, by computing anticipable alarm conditions with their related original static analysis alarms from the set of static analysis alarms using one or more code analysis techniques such as static analysis, data flow analysis, abstract interpretation and so on. In the next step at 308, traceability links are computed between the intermediate repositioned static analysis alarms and their corresponding static analysis alarms from the set of static analysis alarms in traceability links module (208). Further the traceability links between the intermediate repositioned static analysis alarms and static analysis alarms in the set of static analysis alarms are computed based on the anticipable alarm conditions and their related original static analysis alarms.

In the next step at 310, refinement of the intermediate repositioning is performed by repositioning refinement module (210). Further during the refinement of intermediate repositioning, the intermediate repositioned static analysis alarms are merged or not merged at a highest point later in the application code based on computing available alarm conditions with their related original static analysis alarms based on the intermediate repositioned static analysis alarms and their traceability links to the static analysis alarms, using one or more code analysis techniques such as static analysis, data flow analysis, abstract interpretation and so on.

In the next step at 312, traceability links are computed between the refined intermediate repositioned static analysis alarms and their corresponding static analysis alarms from the set of static analysis alarms in traceability links module (208). Further the traceability links between the refined intermediate repositioned static analysis alarms and their corresponding static analysis alarms are computed based on the available alarm conditions and their related original static analysis alarms.

In the next step at 314, a set of final repositioning techniques are performed on the set of refined intermediate repositioned static analysis alarms to obtain the final repositioning of the set of static analysis alarms in final repositioning module (212). Further the set of final repositioning techniques include simplification of the refined intermediate repositioned static analysis alarms to obtain final repositioned static analysis alarms, elimination of redundancy from the final repositioned static analysis alarms, and performing fallback by identifying the repositioning cases that increase the overall number of static analysis alarms after the elimination of the redundancy from the final repositioned static analysis alarms.

In the next step at 316, traceability links are computed between the final repositioned static analysis alarms and their corresponding static analysis alarms from the set of static analysis alarms in traceability links module (208). Further the traceability links between the final repositioned static analysis alarms and the static analysis alarms in the set of static analysis alarms are computed based on the traceability links computed between the refined intermediate repositioned alarms and the static analysis alarms in the set of static analysis alarms. In the next step at 318, the set of final repositioned static analysis alarms is displayed in communication interfaces (106). Further the traceability links between the final repositioned static analysis alarms and static analysis alarms in the set of static analysis alarms is also displayed on request from the user. Further, the repositioned techniques result in reduced redundancy from reporting and manual inspections of the set of static analysis alarms.

According to an embodiment of the disclosure, the system 100 for repositioning of a plurality of static analysis alarms can also be explained with the help of following example to determine the practicality and effectiveness of alarms repositioning technique to reduce number of static analysis alarms.

Several experiments were conducted, wherein one experimental setup implemented static analysis alarms repositioning on top of analysis framework of a commercial static analysis tool (CSAT). The analysis framework supports analysis of C programs, and allows to implement data flow analyses using function summaries. Further limited versions of the both antconds analysis and avconds analysis were implemented in inter-functional setting, by solving the data flow analyses in bottom-up order only. Further in the antconds analysis, conditions anticipable at the function entry were propagated to its caller only if the function is called from a single place. Further in the avconds analysis, all the conditions available at the function exit were propagated to the caller irrespective of the call invocations of the function. This implementation results in repositioning a static analysis alarm at multiple locations, and for certain cases discussed above, fallback approach was implemented, which is explained in detail in the following sections below.

Considering a use case example for evaluation purpose, shown in FIG. 8, which shows is a table that comprises 20 applications including 16 open source and four industry applications.

The applications are analyzed using a commercial static analysis tool on a computer with i7 2.5 GHz processor and 16 GB RAM. The open source applications are selected from the benchmarks used for evaluating the grouping techniques known in art. Further static analysis alarms corresponding to four commonly checked categories of run-time errors: division by zero (ZD), array index out of bounds (AIOB), integer overflow/underflow (OFUF), and uninitialized variables (UIV) are selected, wherein the selected static analysis alarms were after their postprocessing using the state-of-the-art static analysis alarms grouping techniques. Further only dominant static analysis alarms are used as input to repositioning. Further static analysis alarms having function calls in their alarm conditions are excluded from grouping and repositioning. Further Table 1 shows the result of number of alarms before and after the repositioning, and the percentage of alarms reduced, represented in columns # Input, # Output, and % Reduction respectively. The percentage of reduced alarms ranges between 0 and 20%, with the median reduction 7.25% and the average reduction 6.47% as presented in Table 1. Furthermore, the average reduction on open source applications is 5.41% as compared to the 13.07% on the industry applications. Further Table 1 also details the improvements resulting from the post processing of repositioned conditions (steps 2 and 3 of final repositioning techniques). Further column Redundant conds of Table 1 presents the number of repositioned conditions identified as followers, i.e., redundant conditions, by the grouping technique in Step 2 of final repositioning techniques. Further, the column Redundant conds shows that around 1% of the repositioned conditions computed by Step 1 of final repositioning techniques are identified as redundant by Step 2. Further, the column Fallbacks in Table 1 presents the number of instances, 23, where fallback got applied, indicating that the fallback gets applied rarely in practice. Further manual analysis of these 23 fallback instances showed that (a) three instances were due to the kind of interfunctional implementation that we had for avconds/antconds computation; (b) 18 instances were because of the two repositioning goals impacting each other; and (c) the other 2 cases were due to computing the conditions transitively. Furthermore, the results in Table 1 indicate that while merging of static analysis alarms originally reported in different functions is not frequent (results shown in column Mergings), repositioning static analysis alarms across the function boundaries is quite common (results shown in column Repos.). From the analysis it can be understood that the reasons for stopping backward repositioning shows that for around 6% of the repositioned alarms, the backward repositioning stopped at the entry of a function as the function was called from more than one place (results shown in column Func entry). Further another reason for stopping backward repositioning can be understood that for around 59% of the repositioned alarms, the backward repositioning stopped due to branching nodes, wherein the repositioned warning appears only in one branch of the if statement (results shown in column Branches) and finally for the other repositioned alarms (35%), the backward repositioning stopped due to definitions of a variable appearing in the alarm conditions (results shown in column Definitions).

Hence a system and method for repositioning of a plurality of static analysis alarms is provided. The proposed repositioned techniques, reposition set of static analysis alarms up or down the application code from the program points of their original reporting, for reducing the number of static analysis alarms reported or for reporting them closer to their causes or for both the objectives. Further, the repositioned techniques also ensure the repositioning of the static analysis alarms is without affecting the errors uncovered by them.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor-implemented method for repositioning of a plurality of static analysis alarms, comprising:
   providing an application code as an input to a static analyzer module;
   performing static analysis on the application code to generate a set of static analysis alarms, wherein the set of static analysis alarms detect errors in the application code;
   performing intermediate repositioning of the set of static analysis alarms, wherein each static analysis alarm in the set of static analysis alarms is temporarily repositioned upward at highest program points in the application code without affecting errors detected by the set of static analysis alarms;
   computing traceability links between the intermediate repositioned static analysis alarms and their corresponding static analysis alarms from the set of static analysis alarms;
   performing refinement of the intermediate repositioning;
   computing traceability links between the refined intermediate repositioned static analysis alarms and their corresponding static analysis alarms from the set of static analysis alarms;
   performing a set of final repositioning techniques on the set of refined intermediate repositioned static analysis alarms to obtain the final repositioning of the set of static analysis alarms;
   computing traceability links between the final repositioned static analysis alarms and their corresponding static analysis alarms from the set of static analysis alarms; and
   displaying the set of final repositioned static analysis alarms.

2. The method of claim 1, wherein each of the static analysis alarms in the set of static analysis alarms is temporarily repositioned upward closer to cause points for its generation, by computing anticipable alarm conditions with their related original static analysis alarms from the set of static analysis alarms using one or more code analysis techniques such as static analysis, data flow analysis, abstract interpretation and so on.

3. The method of claim 1, wherein the traceability links between the intermediate repositioned static analysis alarms and static analysis alarms in the set of static analysis alarms are computed based on the anticipable alarm conditions and their related original static analysis alarms.

4. The method of claim 1, wherein during the refinement of intermediate repositioning, the intermediate repositioned static analysis alarms are merged or not merged at a highest point later in the application code based on computing available alarm conditions with their related original static analysis alarms based on the intermediate repositioned static analysis alarms and their traceability links to the static analysis alarms, using one or more code analysis techniques such as static analysis, data flow analysis, abstract interpretation and so on.

5. The method of claim 1, wherein the traceability links between the refined intermediate repositioned static analysis alarms and the static analysis alarms in the set of static analysis alarms are computed based on the available alarm conditions and their related original static analysis alarms.

6. The method of claim 1, wherein the set of final repositioning techniques include simplification of the refined intermediate repositioned static analysis alarms to obtain final repositioned static analysis alarms, elimination of redundancy from the final repositioned static analysis alarms, and performing fallback by identifying the repositioning cases that increase the overall number of static analysis alarm after the elimination of the redundancy from the final repositioned static analysis alarms.

7. The method of claim 1, wherein the traceability links between the final repositioned static analysis alarms and the static analysis alarms in the set of static analysis alarms are computed based on the traceability links computed between the refined intermediate repositioned alarms and the static analysis alarms in the set of static analysis alarms.

8. A system for repositioning of a plurality of static analysis alarms, the system comprising:
   a memory (102) storing instructions and one or more modules (108);

one or more communication or input/output interfaces (106); and one or more hardware processors (104) coupled to the memory (102) via the one or more communication interfaces (106), wherein the one or more hardware processors (104) are configured by the instructions to execute the one or more modules (108) comprising:

static analyzer module (202) for receiving an application code as an input and performing static analysis on the received application code to generate a set of static analysis alarms, wherein the set of static analysis alarms detect errors in the application code;

intermediate repositioning module (206) for performing intermediate repositioning of the set of static analysis alarms, wherein each static analysis alarm in the set of static analysis alarms is temporarily repositioned upward at highest program points in the application code without affecting errors detected by the set of static analysis alarms;

traceability links module (208) for computing traceability links between the intermediate repositioned static analysis alarms and their corresponding static analysis alarms from the set of static analysis alarms;

repositioning refinement module (210) for performing refinement of the intermediate repositioning;

traceability links module (208) for computing traceability links between the refined intermediate repositioned static analysis alarms and their corresponding static analysis alarms from the set of static analysis alarms;

final repositioning module (212) for performing a set of final repositioning techniques on the set of refined intermediate repositioned static analysis alarms to obtain the final repositioning of the set of static analysis alarms;

traceability links module (208) for computing traceability links between the final repositioned static analysis alarms and their corresponding static analysis alarms from the set of static analysis alarms; and communication or input/output interfaces (106) for displaying the set of final repositioned static analysis alarms.

9. A non-transitory computer-readable medium having embodied thereon a computer readable program, wherein the computer readable program, when executed by one or more hardware processors, cause:

providing an application code as an input to a static analyzer module;

performing static analysis on the application code to generate a set of static analysis alarms, wherein the set of static analysis alarms detect errors in the application code;

performing intermediate repositioning of the set of static analysis alarms, wherein each static analysis alarm in the set of static analysis alarms is temporarily repositioned upward at highest program points in the application code without affecting errors detected by the set of static analysis alarms;

computing traceability links between the intermediate repositioned static analysis alarms and their corresponding static analysis alarms from the set of static analysis alarms;

performing refinement of the intermediate repositioning;

computing traceability links between the refined intermediate repositioned static analysis alarms and their corresponding static analysis alarms from the set of static analysis alarms;

performing a set of final repositioning techniques on the set of refined intermediate repositioned static analysis alarms to obtain the final repositioning of the set of static analysis alarms;

computing traceability links between the final repositioned static analysis alarms and their corresponding static analysis alarms from the set of static analysis alarms; and displaying the set of final repositioned static analysis alarms.

\* \* \* \* \*